Patented July 13, 1954

2,683,700

UNITED STATES PATENT OFFICE 2,683,700

LATEX PAINTS STABILIZED AGAINST FREEZING

Harvey T. Gehring, Chicago, Ill., assignor to The Sherwin-Williams Company, Cleveland, Ohio, a corporation of Ohio No Drawing. Application February 25, 1952, Serial No. 273,348

8 Claims. (Cl. 260—29.7)

This invention relates to water-containing coating compositions containing polymeric organic material dispersed therein in finely divided form.

More particularly the invention relates to a means of stabilizing emulsion polymers useful in coating compositions from breakdown due to alternate freezing and thawing of the aqueous or continuous phase.

Specifically, this invention relates to the use of ureides in conjunction with an emulsion polymer system of the oil-in-water class. In the preferred form of the invention, use is made of monovinyl aromatic hydrocarbon units and aliphatic conjugated diolefine units polymerized together through the exercise of emulsion polymerization techniques. Addition of certain ureides to the resultant latex contributes to the capacity of the emulsion system to resist coagulation or emulsion breakdown due to extreme variations in temperature.

Experience indicates that breakdown due to freezing and thawing of emulsion systems is indirectly related to the disperse phase, but more directly with the nature and composition of the continuous aqueous phase. From this, it is obvious that the addition of ureides is undoubtedly also useful for the same purposes in latices formed by dispersion in water of bulk polymers after their formation. However, latex systems formed in this manner are presently of less interest for the production of commercial emulsion-type coating compositions than those formed by or through emulsion polymerization techniques.

In the past several years, the commercial importance of emulsion-type compositions for coating purposes has developed to the extent of being a major replacement for the conventional solvent-type coatings useful for finishing and redecorating interior wall areas. Freedom from solvent odor, ease of application, freedom from fire hazard and economy in use have contributed materially to consumer acceptance of emulsion-type protective and decorative coatings.

Advent of large consumer demand has meant increased inventories of finished latex emulsion paints, and in turn, has brought into focus the problem of storage and handling of water-containing materials under a variety of weather conditions. Without doubt, the greatest hazard in handling and storage of emulsion paints containing water in the continuous phase, arises from storage and handling at freezing temperatures. Often in either shipment or storage, large quantities of these materials freeze. Upon subsequent thawing, the coating composition loses fluidity and can no longer be satisfactorily applied by brushing. The lot frozen becomes a total loss. While heated warehousing and heated shipping means offer a solution, this solution is impractical over a nationwide distribution system.

It is the object of this invention to provide a method of stabilizing a paint latex emulsion polymer system against breakdown and deterioration due to alternate freezing and thawing by addition thereto of a quantity of a water-soluble ureide.

It is more specifically an object of this invention to provide a more universally useful paint latex which comprises an oil-in-water emulsion polymerization product of an aromatic vinyl compound containing a single center of unsaturation and a conjugated diolefin as the primary components containing a stabilizing amount of a water-soluble ureide.

It is the specific object of this invention to provide a pigmented, oil-in-water emulsion-type coating composition capable of depositing a continuous film when dry, containing a disperse phase comprising an emulsion polymer having at least 40 mol percent of a monovinyl aromatic hydrocarbon of the benzene series having a single center of unsaturation and between 33 and 60 mol percent of an aliphatic conjugated diolefin in chemical combination, a continuous aqueous phase containing a protective colloid and a quantity of from about 1% to 15% based on said latex solids of a water-soluble ureide containing not more than four carbon atoms, if alkyl-substituted.

Stabilizers useful for the purposes of this invention include in the preferred form of the invention, urea and thiourea. Investigation of a homologous series of compounds similar in structure and related to urea have shown that monomethyl urea; dimethyl urea, both symmetrical and unsymmetrical; dimethylol urea; monoethyl urea; diethyl urea, both symmetrical and unsymmetrical; trimethyl urea; n-propyl urea; isopropyl urea and n-butyl urea, all of which are water-soluble, are useful for the purposes of this invention. Only thiourea of the analogous sulfur series of compounds was found to be of value, however. Water-insoluble homologs and analogs of urea, including, for example, isobutyl urea, pentyl urea and tetraethyl urea are water-insoluble and, hence, of no practical value for the purposes of prevention of emulsion breakdown. Tetraethyl urea, biuret, thiosemicarbazide, symmetrical diethyl urea, dibutyl thiourea and dibutyl urea were also tested and found to be of little interest. From the extensive laboratory investigation made to determine the scope of compounds useful for the purposes of the invention, it has been found that water-soluble compounds containing the bivalent ureylene nucleus (J. A. C. S. 55 3918, 1933)

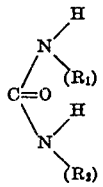

wherein $R_1$ and $R_2$ are radicals selected from the group consisting of hydrogen, hydroxyl, alkyol and alkyl radicals containing not more than 4 carbon atoms wherein the sum of the carbon atoms in $R_1$ plus $R_2$ does not exceed 5, defines the scope of useful additives.

When the substituents on the ureylene nucleus are such that the resulting ureide compound is water-insoluble, the compounds are not practically useful for the purposes of the invention. The exploratory work among related compounds of urea for comparison of effectiveness were made upon an equal weight basis. Their use on an equal molar basis was checked, but very little difference was observed upon use of large amounts. Large amounts of stabilizer are considered to be undesirable for the reason that water-soluble constituents in a paint film reduce washability of films deposited therefrom. Additionally, large amounts of the urea class of stabilizers have been found to affect the viscosity of the final product unduly. Excesses are also economically wasteful and should, if for no other reason than costs, be avoided.

The art of emulsion polymerization has reached practical utilization only recently and the patent art on the subject has been enriched tremendously since the rubber shortages of World War II. While pooling of general information by those working in the field has been generally practiced, much of the specific information on actual emulsion polymerization techniques known to specific groups in the art is still not generally available. Further, the great interest and emphasis in that art has been in the production of elastomers in bulk form for use as a replacement for rubber, e. g., in the massive form, and not for purposes of protective and decorative coatings. Presently, therefore, definitions of all the qualities and characteristics of emulsion polymers useful for coating purposes cannot be set forth as the art is very new. For this reason, the term "paint latex" is used herein to refer to emulsion polymer systems. This for the reason that language in this art as it relates to the subject at hand is, like the art, quite undeveloped. These latices are also referred to by some who are employed in the art as "reverse rubbers" for the reason that the proportions of aromatic vinyl compound and diolefin are in reverse ratio to the usual copolymer rubbers used in massive form for the manufacturing of tires, etc.

The term "paint latex" or "reverse rubber latices," as adapted herein, refers to the concept of a dispersed phase polymer formed or polymerized in an aqueous carrier, the oil-in-water type emulsion resulting having specific physical characteristics and preferably certain chemical constituents, as herein set forth.

More specifically, the term "paint latex" or "reverse rubber latex" includes particularly, but is not known to be limited to, the products of emulsion polymerization. The emulsion polymers produced from two or more unsaturated polymerizable components in the presence of surface active agents of non-ionic and anionic character as stabilizers and one or more per-compounds, e. g., peroxides, persulfates, etc. as accelerators of polymerization in such manner and proportions as to form an aqueous emulsion polymer system produce the preferred latices. All of the paint latices of interest to this invention which have been examined in detail have a particle diameter of the disperse phase in excess of 0.2 microns and preferably from 0.2 to about 0.4 microns. The pH of the aqueous phase is from 7.5 to 11 and preferably from 8.0 to 10, and the water content is not more than 60%, usually from 45 to 55%, of the total weight of the emulsion polymer. A further essential characteristic of materials included in the term "paint latex" is that the latex or blend of two or more latices to qualify for paint and related coating usage and to bear the name "paint latex" shall be capable of agitation in a malted milk-type [1] drink mixer at a rate of rotation of the agitator of 12,000 R. P. M. for one-half hour without showing graining, viscosity change or other characteristic evidences of emulsion breakdown. Latices not meeting the above specifications are not useful for coatings and are excluded from the scope of the term "paint latex" as used herein.

Presently, the most useful paint latices are copolymers and terpolymers comprising monovinyl aromatic hydrocarbons and aliphatic conjugated diolefins containing not more than 67 mol percent of the monovinyl aromatic hydrocarbon and not more than 60 mol percent of the aliphatic conjugated diolefine. Latices within this class are described in U. S. Patents 2,498,712 and 2,479,967. The term "paint latex" includes the product of a single emulsion polymerization, or a blend of two or more emulsion polymerization products. However, to qualify as a paint latex, the single product or the blend of oil-in-water emulsion products utilized as the paint latex must be capable of depositing a continuous film from the disperse polymer containing phase. Having thus described the scope of the term "paint latex" as accurately as the present state of knowledge concerning this class of composition will allow, the term shall be understood to include all of the limitations as set forth above.

As is presently known, most of the paint latices available from commercial latex producers using emulsion polymerization techniques employ principally butadiene 1,3 as the aliphatic conjugated diolefine and styrene as the aromatic vinyl compound containing a single reactive center of unsaturation as the essential monovinyl aromatic hydrocarbon. Isoprene and vinyl toluene are illustrative of the other useful combinations.

In researches toward practical paint formulations of emulsion-type coating compositions, I have found that emulsion copolymers of the butadiene-styrene class containing about 80% by weight of styrene will not deposit continuous films, but may be blended with additional quantities of emulsion polymers of the same class

---

[1] Drink Master Model #30—Hamilton Beach Company.

containing as little as 40 mol percent styrene to deposit continuous films. Emulsion polymers of the first description will generally withstand freezing and thawing without breakdown, but when combined with emulsions having a plasticizing effect to form continuous films, as with emulsion polymers of the second description, are prone to break and become useless in protective and decorative emulsion coatings. From many laboratory tests, it appears to be a general rule that when a latex is compounded suitable to deposit continuous films as is essential to completed paint latex formulation for coating purposes, they acquire the faulty characteristic of lack of stability upon alternate freezing and thawing.

It is obvious that emulsion paints, both of the pigmented and clear class, intended for storage and shipment the year around in temperate climates are subject to freezing. Upon freezing, all of the paint latices of commerce (except for odd and inconsistent batches) tested to date break down and become valueless after several freezing and thawing cycles. Accordingly, research has been extensive to find ways of making latex coatings for paint and allied purposes stable against this natural phenomenon, for great financial losses may be suffered when shipments of material are made during severely cold weather. From general experience in this field, it has been observed that latices vary in their emulsion stability (particularly in relation to freezing) depending upon the kind and amount of ionic and non-ionic emulsifier and other materials used in their manufacture in small amount and other characteristics of the latex as are inherent in the techniques known only to the original producer. It has been observed, however, that the freeze and thaw cycle stability of the various latices commercially available is enhanced by the addition of from about 1% to 15% of a stabilizer of the class herein described based upon the paint latex solids in the coating composition, but the preferred range has been found to lie in the range of from about 4% to 8% by weight based on said solids content. Thus, if a paint latex will withstand one freezing and thawing cycle, the addition of a ureide as described herein permits further cycling without deterioration, impossible without the additive.

As previously indicated, the useful freeze stabilizing additives for my purpose include compounds containing a ureylene nucleus broadly and urea and thiourea specifically. Urea is by far the most promising stabilizer as it is available commercially of good purity, is economical in cost and is more effective on a purely weight basis than any of the other materials closely related thereto which may be used as substituents therefor. While thiourea is useful and is claimed in my copending application filed of even date herewith, U. S. Serial 273,347, substituted thioureas are of practically negligible value. The stabilizers of particular value are defined broadly as water-soluble compounds having a ureylene nucleus which, if substituted, contain not more than 5 carbon atoms and not more than 4 carbon atoms in any one substituent aliphatic group. Further not less than 1 hydrogen atom can be directly associated with each of the nitrogen atoms of the parent ureide. Water solubility appears to be essential.

The principle behind the use of ureides as freeze stabilizers is not understood, but it is clear from experimental results that the action is not that of the effect of ionizable salts upon the freezing point of water. Ionic inorganic salts have an adverse effect in emulsion type paint coatings upon emulsion stability and should be avoided generally.

The following examples are illustrative but not to be taken as limiting upon the scope of the improvement herein described.

EXAMPLE 1

An emulsion copolymer of commerce [2] containing 45% solids of which 40 parts were butadiene by weight and 60 parts by weight were styrene were frozen and allowed to thaw. Upon thawing, the viscosity had increased and the material coagulated to a point no longer useful.

EXAMPLE 2

Two hundred parts of the above emulsion copolymer were combined with 6.3 parts of urea. The sample was alternately taken down to −10 degrees below zero F. and up to 77 degrees F. for 4 successive times. The sample showed no apparent changes in viscosity or emulsion stability and could be used to deposit a clear coating of continuous nature.

EXAMPLE 3

A second emulsion copolymer [3] of commerce coming within the scope of the definition as set forth above for a paint latex contained 37 parts butadiene and 63 parts styrene by weight and was subject to freezing and thawing. Upon thawing for the first time, the emulsion was broken down so that it was no longer useful for a coating composition.

EXAMPLE 4

A 200 gram sample of the above latex (Example 3) was combined with 13 parts of urea and subjected to freezing and thawing as in Example 3. After 4 cycles, the latex was not visibly affected and was used to deposit a clear coating on paper.

EXAMPLE 5

A third emulsion copolymer of commerce [4] containing 33 percent of butadiene and 67 percent of styrene by weight and meeting all of the tests of a paint latex as hereinbefore set out was subjected to a freeze and thaw cycle. After reaching room temperature, the physical nature of the emulsion was such as to be unsuited for further use in paint formulations of the emulsion type.

EXAMPLE 6

200 parts by weight of the emulsion copolymer of Example 5 were combined with 9 parts by weight of urea. After solution of urea in the aqueous continuous phase, the material was subjected to freezing and thawing without materially affecting the physical character of the emulsion system.

EXAMPLE 7

80 parts of an emulsion polymer of commerce [5] containing 80 percent styrene and 20 percent of butadiene by weight (found not to lay down a continuous film by itself) was combined with 120 parts of an emulsion polymer of commerce as described in Example 1 (which does deposit a continuous film). 100 parts of the mixture were frozen and thawed. Upon thawing out to room temperature, the mixed polymeric dispersions in water were found to be unsuited for coating purposes.

---

[2] Dow Chemical Company 512–K.
[3] Firestone Tire and Rubber Company F–4 latex.
[4] Dow 762–K.
[5] Dow Chemical Company 529–K.

EXAMPLE 8

To the second aliquot portion of 100 parts of mixture of Example 7 were added 2 parts of urea. After the urea had been dissolved in the aqueous phase, the emulsion system was subjected to −10 degrees below zero F. temperatures overnight and thawed to 77 degrees F. the following day. The viscosity of the product had not been changed appreciably by the treatment and the coating laid down a continuous film on paper.

EXAMPLE 9

Same as Example 2, with the substitution of thiourea for urea. Comparable results were obtained.

EXAMPLE 10

Same as Example 4, but thiourea was substituted for urea. Similar stability was observed as with urea.

EXAMPLE 11

Same as Example 6, but thiourea was substituted for urea. There was some indication that on equal weight substitution, thiourea was not quite as effective as urea. However, the resultant material after thawing deposited a continuous film upon paper.

EXAMPLE 12

A series of tests as in the above Examples 1–8 was made substituting butyl urea for urea. Butyl urea was found slightly less effective than urea and thiourea when used on an equal weight substitution basis, but was effective.

EXAMPLE 13

A series of tests were run as described in Examples 1–8 above, substituting symmetrical dimethyl urea for urea. While slightly less effective as a stabilizer than urea, the results were useful for the purpose and prevented emulsion breakdown of the latex due to freezing.

EXAMPLE 14

A series of tests as described in Examples 1–8 were carried out substituting dimethylol urea for urea on an equal weight basis. The dimethylol carbamide was found to have a stabilizing effect upon the latices tested against breakdown by alternate freezing and thawing.

EXAMPLE 15

Biuret was tested in lieu of urea as the stabilizer additive as in Examples 1–8. Practically no stabilizing effect was observed.

EXAMPLE 16

Symmetrical diethyl thiourea was tested in lieu of urea as the stabilizer additive as in Examples 1–8. Freeze stability was not noticeably improved thereby.

EXAMPLE 17

Hydroxy urea was tested in a series of examples similar to 1–8, substituting it for urea. A similar improvement in freeze stability of the latices was observed as with urea.

EXAMPLE 18

Two quarts of two different commercial emulsion paints known to contain latex as the principal binder were purchased on the open market. Each sample was divided into two aliquot portions. To one portion of each sample 1¼% by weight of urea was added. After one freeze and thaw cycle (−50 degrees F. to +75 degrees F.) the samples not containing urea were broken and not suitable as paints as to application characteristics. The samples containing the additive were still useful after the cycle test.

The following examples are further illustrative of latex emulsion paint formulations which have been improved in each instance in their ability to withstand ultimate freezing and thawing cycles by the addition of ureides thereto.

Stabilizer solution "A"

75 parts dried acid precipitated casein and 412 parts of water were weighed into a jacketed vessel equipped with an agitator. The temperature of the slurry was increased to 160 degrees F. after which 10 parts of sulfonated tallow and 8 parts of sodium pentachlorophenate, 5 parts of borax and 5 parts of 26 degree Baumé ammonia were added and stirred into the aqueous solution. Thereafter the temperature was increased to 170 degrees F. and held for a half hour. This solution was then drawn off for use in the preparation of some of the following examples.

Stabilizer solution "B"

380 parts of water and 60 parts of dried soya protein [6] were weighed into a jacketed mixing vessel. The temperature of the slurry was increased to about 150 degrees F. and 15 parts of sulfonated tallow and 8 parts of sodium orthophenylphenate, 2.5 parts of caustic soda and 7.5 parts of boric acid were added. Thereafter the temperature was increased to 165 to 175 degrees F. and held for a half hour. The prepared protein solution was drawn off for later use in the formulation of latex paints.

EXAMPLE 19

Oil-modified latex paint

| | Parts |
|---|---|
| Lithopone | 100 |
| Rutile TiO$_2$ | 150 |
| Ferrite yellow | 2 |
| Black iron oxide | 2 |
| Mica | 40 |
| Clay | 65 |
| Lorite (75% calcium carbonate and 25% diatomaceous silica [7]) | 60 |
| Sodium salt of alkyl aryl sulfonate | 3 |
| Tetra sodium pyrophosphate | 2 |
| Soya protein solution (Stabilizer solution "B") | 175 |
| Water | 188 | were thoroughly mixed together. Thereafter 45 parts of four-minute heat bodied linseed oil, 1 part of 25% lead naphthenate, 3 parts of 6% cobalt naphthenate and 4 parts of pine oil were added to the pigment slurry. After incorporation of the oils and driers, the pigment slurry was passed through a zone of high shear (e. g., a colloid mill) into a thin-down vessel. Thereafter 300 parts of a paint latex and 6 parts of urea were mixed into the milled emulsion. The paint latex contained 200 parts of a 45% solids emulsion copolymer containing approximately 60% styrene and 40% butadiene [8] and 100 parts of an emulsion copolymer containing 80% styrene and 20% butadiene [9].

---
[6] Drackett 220 orthoprotein.
[7] National Lead Company.
[8] Dow Chemical Company 512K.
[9] Dow Chemical Company 529K.

EXAMPLE 20

Same as Example 19 except that thiourea was substituted for urea.

EXAMPLE 21

*Soya protein stabilized latex paint*

| | Parts |
|---|---|
| Lithopone | 50 |
| Rutile TiO$_2$ | 240 |
| Mica | 60 | were thoroughly incorporated into 165 parts of stabilizer solution "B" along with 140 parts of water containing 2 parts of tetra sodium pyrophosphate and 2.5 parts of sodium alkyl aryl sulfonates.[10] To the aqueous slurry of pigment were added 10 parts of sulfonated tallow and 30 parts of a four-minute heat bodied linseed oil containing 1 part of 25% lead naphthenate and 2 parts of 6% cobalt naphthenate. After thorough incorporation of the above ingredients, the mass was passed through a zone of high shear to produce a uniform emulsion and dispersion and collected in a thin-down vessel equipped with an agitator. Thereafter 425 parts of a 45% solids paint latex,[11] 200 parts of water and 15 parts of urea were added to the milled mass. The yield was 125 gallons of latex emulsion paint.

EXAMPLE 22

The above example was repeated with the substitution of a paint latex containing approximately 62% styrene and 38% butadiene.[12]

EXAMPLE 23

Same as Example 21 except a paint latex containing 60% styrene and 40% butadiene[13] was substituted.

EXAMPLE 24

*Oil-free casein stabilized latex paint*

| | Parts |
|---|---|
| Rutile TiO$_2$ | 200 |
| Lithopone | 100 |
| Mica | 25 |
| Clay | 75 |
| Tetra sodium pyrophosphate | 2 |
| Casein solution | 192 |
| Pine oil | 4 |
| Water | 112 | were thoroughly mixed and passed over a colloid mill to assure uniform dispersion of the pigmentary material. To the milled pigment slurry was added 425 parts of a 45% solids paint latex containing 67% styrene and 33% butadiene copolymerized by emulsion techniques.[14] To the completed paint was added 12 parts of urea as a freeze stabilizing additive. The yield was approximately 100 gallons.

EXAMPLE 25

Example 25 was similar to Example 24 with the substitution of a paint latex containing 60% styrene and 40% butadiene as the components of an emulsion copolymer. This latex contained approximately 45% solids.[15]

---
[10] Nacconal NRSF.
[11] Dow Chemical Company Emulsion Copolymer 762K containing 67% styrene and 33% butadiene approx.
[12] Firestone F-4.
[13] Dow Chemical Company 512K.
[14] Dow Chemical Company 762K Latex.
[15] General Tire & Rubber Latex DGY159F.

EXAMPLE 26

*Sodium carboxy methyl cellulose stabilized latex paint*

| | Parts |
|---|---|
| Lithopone | 200 |
| Rutile TiO$_2$ | 55 |
| Ultramarine blue | 50 |
| Pigment green B | 15 |
| Mica | 40 |
| Tetra sodium pyrophosphate | 2 |
| Sodium carboxy methyl (high viscosity) | 5 |
| Alkylolamide emulsifying agent[16] | 15 |
| Sodium polyacrylate[17] | 10 |
| Sulfonated tallow (antifoam) | 10 |
| Four-minute, heat bodied linseed oil | 45 |
| 25% lead naphthenate | 1 |
| 6% cobalt naphthenate | 3 |
| Water | 305 |
| Pine oil | 4 |

The above ingredients were thoroughly mixed together and passed through a colloid mill into a reducing vessel. To the milled material was added 342 parts of a 40% solids paint latex[18] and 12 parts of urea. The yield was 100 gallons of ready-to-apply emulsion paint.

The above examples are believed to illustrate fully the best mode of practicing my invention. It may be further illuminating to point out that the commercial latices available vary from batch to batch, and give inconsistent results which are disconcerting, particularly as to free stability. For example, certain latices have not been freeze stable by themselves, but exhibit improved freeze resistance after pigmentation. However, upon addition of the described ureides as stabilizers, said latices pass freeze tests both pigmented and non-pigmented. Another lot of the same latex will lack stability even after pigmentation, but upon addition of a ureide of the class described, will pass freeze stability tests. In all instances, stability against freezing and thawing cycles was improved by the method disclosed.

In general, the higher the degree of substitution of the ureylene nucleus, the less effective are additives in their stabilizing effects.

Having thus described the best mode of accomplishing the ends of my invention, I claim:

1. A paint latex comprising an oil-in-water emulsion polymerization product of a major amount of an aromatic mono vinyl compound and a minor amount of a conjugated diolefine containing stabilizing amounts of thiourea.

2. A pigmented oil-in-water emulsion type coating composition capable of depositing a continuous film when dried including as the principal binder therein an emulsion polymer of a major amount of an aromatic mono vinyl compound having a single center of unsaturation and a minor amount of a conjugated diolefine, said polymer having a particle size of at least 0.2 micron in diameter and characterized by its ability to withstand subjection to high shear rates for extended time intervals without graining and a quantity of thiourea sufficient to prevent emulsion breakdown due to freezing and thawing.

3. A pigmented oil-in-water emulsion type coating composition capable of depositing a continuous film when dried including as the principal binder therein an emulsion polymer comprising a major proportion of an aromatic vinyl com- ---
[16] Ninol Laboratory 2012A.
[17] Modical VD.
[18] 62% styrene=38% butadiene latex (Firestone F-4).

pound having a single center of unsaturation and a minor proportion of a conjugated diolefine, said polymer having a particle size of at least 0.2 micron in diameter and characterized by its ability to withstand subjection to high shear rates for extended time intervals without graining and a quantity of from 1% to 15% by weight of said copolymer solids of thiourea.

4. A method of protecting pigmented emulsion paints of the oil-in-water type containing a paint latex the dispersed phase of which comprises a copolymer of a major proportion of a monovinyl aromatic hydrocarbon and a minor proportion of a conjugated diolefine against deterioration due to freezing and thawing which comprises adding from 1% to 15% by weight of said latex solids of thiourea to the paint system.

5. In a pigmented oil-in-water emulsion type coating composition capable of depositing a continuous film when dry containing a disperse phase consisting essentially of an emulsion polymer having at least 40 mol percent of a monovinyl aromatic hydrocarbon of the benzene series having a single center of unsaturation and between 33 and 60 mol percent of an aliphatic conjugated diolefine in chemical combination and a continuous aqueous phase containing a protective colloid, the improvement which comprises the presence in said aqueous phase of emulsion stabilizing quantities of thiourea.

6. In a pigmented oil-in-water emulsion type coating composition capable of depositing a continuous film when dry containing a disperse phase consisting essentially of an emulsion polymer having at least 40 mol percent of a monovinyl aromatic hydrocarbon of the benzene series having a single center of unsaturation and between 33 and 60 mol percent of an aliphatic diolefine in chemical combination and a continuous aqueous phase containing a protective colloid, the improvement which comprises the presence in said aqueous phase of from 1% to 15% of thiourea.

7. In a pigmented oil-in-water emulsion type coating composition capable of depositing a continuous film when dry containing a disperse phase consisting essentially of an emulsion polymer having at least 40 mol percent of a monovinyl aromatic hydrocarbon of the benzene series having a single center of unsaturation and between 33 and 60 mol percent of an aliphatic diolefine of the class consisting of butadiene and isoprene in chemical combination and a continuous aqueous phase containing a protective colloid, the improvement which comprises the presence in said aqueous phase of from 1% to 15% of thiourea.

8. A pigmented oil-in-water emulsion type coating composition capable of depositing a continuous film when dry containing a disperse phase consisting essentially of an emulsion polymer having at least 40 mol percent of a monovinyl aromatic hydrocarbon of the benzene series having a single center of unsaturation and between 33 and 60 mol percent of an aliphatic diolefine of the class consisting of butadiene and isoprene in chemical combination and a continuous aqueous phase containing a protective colloid, the improvement which comprises the presence in said aqueous phase of from 4% to 8% of thiourea.

References Cited in the file of this patent
UNITED STATES PATENTS

| Number | Name | Date |
| --- | --- | --- |
| 2,365,400 | Fikentscher | Dec. 19, 1944 |
| 2,593,236 | Young et al. | Apr. 15, 1952 |